United States Patent
Andrew et al.

(10) Patent No.: US 12,010,076 B1
(45) Date of Patent: Jun. 11, 2024

(54) INCREASING SECURITY AND REDUCING TECHNICAL CONFUSION THROUGH CONVERSATIONAL BROWSER

(71) Applicant: Microsoft Technology Licensing, LLC, Redmond, WA (US)

(72) Inventors: Felix Andrew, Seattle, WA (US); Ryan Gregory Cropp, Seattle, WA (US); Laurentiu T. Nedelcu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/333,265

(22) Filed: Jun. 12, 2023

(51) Int. Cl.
*H04L 51/02* (2022.01)
*H04L 9/40* (2022.01)
*H04L 51/046* (2022.01)
*H04L 51/18* (2022.01)

(52) U.S. Cl.
CPC ............ *H04L 51/02* (2013.01); *H04L 51/046* (2013.01); *H04L 51/18* (2013.01); *H04L 63/20* (2013.01)

(58) Field of Classification Search
CPC ............ H04L 63/1441; H04L 63/0428; H04L 63/1433; H04L 63/1425; H04L 63/102; H04L 63/1416; H04L 63/08; H04L 63/10; H04L 51/02; H04L 63/20
See application file for complete search history.

(56) References Cited

U.S. PATENT DOCUMENTS

| | | | | |
|---|---|---|---|---|
| 8,528,090 | B2* | 9/2013 | Chen | H04L 63/145 726/24 |
| 8,935,769 | B2* | 1/2015 | Hessler | H04L 63/0869 713/171 |
| 9,477,836 | B1* | 10/2016 | Ramam | H04W 12/02 |
| 9,495,661 | B2* | 11/2016 | Zhuang | H04N 21/4788 |
| 10,673,789 | B2* | 6/2020 | Ananthapur Bache | G06F 40/14 |
| 10,826,928 | B2* | 11/2020 | Carey | H04L 63/102 |
| 10,887,348 | B1* | 1/2021 | Brandwine | H04L 63/20 |
| 11,138,463 | B1* | 10/2021 | Wang | G06N 5/047 |
| 11,374,915 | B1* | 6/2022 | Munsell | H04L 63/10 |
| 2012/0005751 | A1* | 1/2012 | Chen | H04L 63/1416 726/25 |
| 2013/0080928 | A1* | 3/2013 | Zhuang | H04L 12/1822 715/758 |
| 2014/0096215 | A1* | 4/2014 | Hessler | H04W 12/06 726/7 |
| 2014/0344774 | A1* | 11/2014 | Padmalata | G06F 11/3608 717/101 |
| 2016/0142438 | A1* | 5/2016 | Pastore | H04L 63/1416 726/4 |
| 2016/0191554 | A1* | 6/2016 | Kaminsky | H04L 63/1425 726/23 |
| 2017/0192882 | A1* | 7/2017 | Bhagavathiammal | G06F 11/3684 |

(Continued)

*Primary Examiner* — Ninos Donabed (57) ABSTRACT

Systems and method for providing an application chatbot that provides a conversational interface that receives natural language input from an application user, interprets the user's intent, and uses application-related context for generating and providing a contextually accurate response in a conversation with the user. In some examples, the application chatbot determines an action to perform corresponding to the response and provides an option to perform the action in the conversational user interface. A selection of the option causes the action to be performed.

20 Claims, 5 Drawing Sheets

(56) References Cited

U.S. PATENT DOCUMENTS

| | | | | |
|---|---|---|---|---|
| 2017/0257385 | A1* | 9/2017 | Overson | H04L 63/1416 |
| 2018/0018465 | A1* | 1/2018 | Carey | G06F 21/50 |
| 2018/0121183 | A1* | 5/2018 | Subramaniyan | G06F 9/45558 |
| 2018/0302437 | A1* | 10/2018 | Pastore | H04L 63/1466 |
| 2020/0065891 | A1* | 2/2020 | Kapoor | G06F 8/33 |
| 2020/0143114 | A1* | 5/2020 | Dua | G06F 3/0481 |
| 2020/0228565 | A1* | 7/2020 | Reverte | H04L 43/16 |
| 2020/0336508 | A1* | 10/2020 | Srivastava | H04L 63/20 |
| 2020/0366696 | A1* | 11/2020 | Willis | H04L 9/321 |
| 2021/0034718 | A1* | 2/2021 | Mantin | G06F 21/14 |
| 2021/0067543 | A1* | 3/2021 | Levy Nahum | H04L 63/1441 |
| 2021/0405976 | A1* | 12/2021 | Gaitonde | G06F 11/3664 |
| 2022/0066744 | A1* | 3/2022 | Körner | G06F 8/77 |
| 2023/0098596 | A1* | 3/2023 | Karri | G06N 3/045 |
| | | | | 717/125 |

\* cited by examiner

INCREASING SECURITY AND REDUCING TECHNICAL CONFUSION THROUGH CONVERSATIONAL BROWSER

BACKGROUND

Applications are designed to help users perform various tasks, such as to access and interact with websites and webpages, electronically communicate, generate, compose, edit, and/or manage information, manipulate data, perform visual construction, resource coordination, calculations, etc. Configurations and features of such applications that improve the functionality of the applications, however, may be difficult to identify or locate. As a result, many of the features and settings of applications are underutilized and the full functionality of the application is not achieved.

It is with respect to these and other considerations that examples have been made. In addition, although relatively specific problems have been discussed, it should be understood that the examples should not be limited to solving the specific problems identified in the background.

SUMMARY

Examples described in this disclosure relate to systems and methods for providing a conversational bot for an application. For instance, the application chatbot provides functionality for receiving natural language (NL) input from the application user, interpreting the intent from the NL input, and using application-related context for generating and providing a contextually accurate response in a conversation with the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example by the accompanying figures, in which like references indicate similar elements. Elements in the figures are illustrated for simplicity and clarity and have not necessarily been drawn to scale.

DETAILED DESCRIPTION

Examples described in this disclosure relate to systems and methods for providing a contextual conversation in association with an application via an artificial intelligence (AI) language model-based application chatbot. For instance, the application chatbot may present an interface where natural language (NL) input of questions associated with security, privacy, features of an application, etc. may be received. The chatbot may also generate NL responses that are contextually accurate for the particular situation or context from which the NL input was received.

In an example implementation, the AI-based chatbot is presented via a web browser application. Various technologies exist to help prevent bad actors from accessing user information when using web browsers; however, internet security technology and terminology can be hard for many users to understand, and options for various application features may be located within menus that many users do not know exist or many not know how to access. As a result, these various application features and settings of web browsers are underutilized. As a result, due to the underutilization of such features, the web browsing experience may be less secure or at least less fully functional. Oftentimes, while such features and settings may not be easily locatable by the user, the user may be more easily able to ask for them in the form of a question or prompt. For instance, users may have security and privacy concerns or questions about particular webpages, where a user may be easily able to formulate a question about their security/privacy concern, such as, "Is it okay to type in my credit card number on this site?" In further examples, users may have other types of concerns or issues about a particular webpage that a user may be easily able to formulate into a question or statement. The backend systems formulate a response that provides the answer or respective related settings for the user. Other non-security features or settings may also be surfaced via the chatbot. For instance, a user may ask questions such as "How do I turn on dark mode?" In such examples, the backend systems similarly formulate a response or directly surfaces the corresponding setting (e.g., dark mode setting).

Thus, an application chatbot is provided that receives NL input from a user, interprets the intent of the NL input, and determines context of the webpage to provide contextually accurate responses. In some examples, the application chatbot queries a language model and one or more information sources to determine a contextually accurate response to present to the user. For instance, a site reputation source may indicate the website the user is unsafe, contains malware, or otherwise has an unfavorable reputation, and the application chatbot may provide a natural language response that the user can easily understand (e.g., "Yes", "No", or "You can provide this site with your email, but not your credit card number"). In some examples, the application chatbot further identifies operations to perform and/or recommend to the user to protect user information, such as one or more settings changes, utilizing an email or payment proxy, using a virtual private network (VPN) to encrypt traffic, correction of a uniform resource locator (URL), etc. In further examples, the application chatbot determines and provides likely subsequent user questions and contextually accurate responses to the likely questions. In some examples, the application chatbot further generates and provides instructions to the application to perform one or more of the determined operations, to perform document object model (DOM) manipulation, and/or other subsequent actions.

Figure 1:
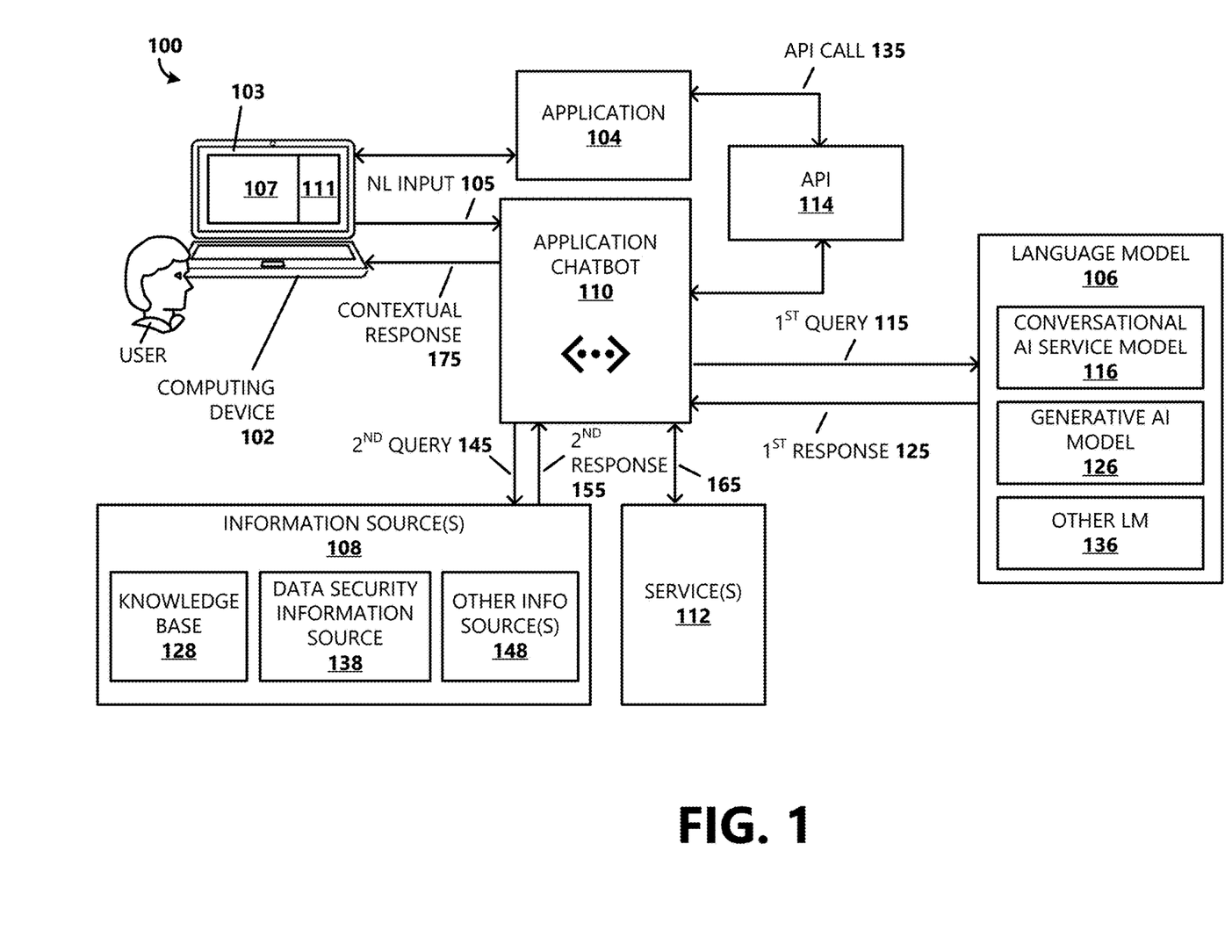
FIG. 1 is a block diagram of an example system in which an application chatbot is implemented and an example communication flow.
Figure 4:
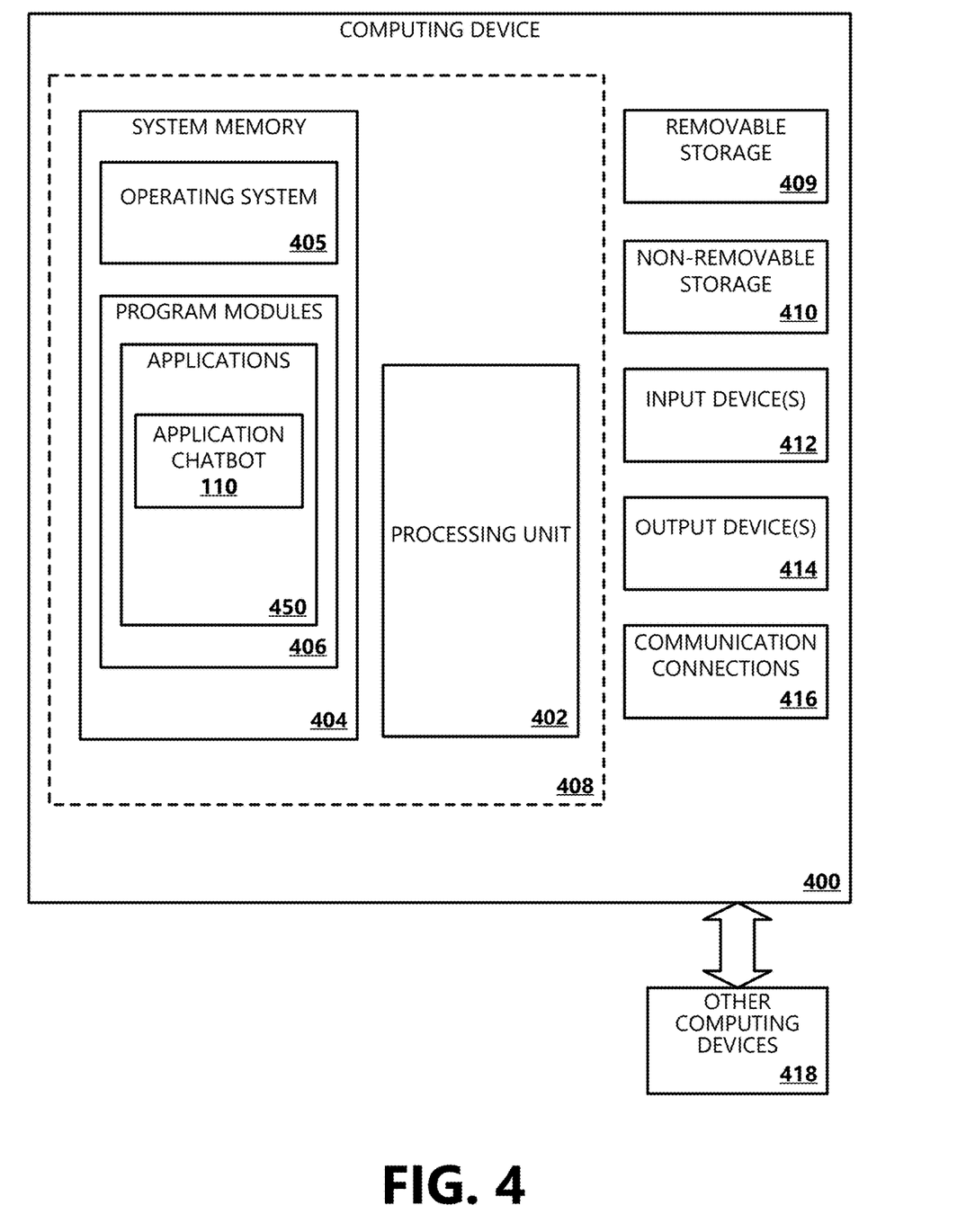
FIG. 4 is a block diagram illustrating example physical components of a computing device with which aspects of the disclosure may be practiced.

FIG. 1 is a block diagram of a system 100 for providing an AI language model-based application chatbot 110 in accordance with an example embodiment. The example system 100, as depicted, is a combination of interdependent components that interact to form an integrated whole. Some components of the system 100 are illustrative of software applications, systems, or modules that operate on a computing device or across a plurality of computer devices. Any suitable computer device(s) may be used, including web servers, application servers, network appliances, dedicated computer hardware devices, virtual server devices, personal computers, a system-on-a-chip (SOC), or any combination of these and/or other computing devices known in the art. In one example, components of systems disclosed herein are implemented on a single processing device. The processing device may provide an operating environment for software components to execute and utilize resources or facilities of such a system. An example of processing device(s) comprising such an operating environment is depicted in FIG. 4. In another example, the components of systems disclosed herein are distributed across multiple processing devices. For instance, input may be entered on a user device or client device and information may be processed on or accessed from other devices in a network, such as one or more remote cloud devices or web server devices.

The example system 100 provides for a contextual conversation in association with an application 104 to surface or expose additional functionality of the application 104. According to an aspect, the system 100 includes a computing device 102 that may take a variety of forms, including, for example, desktop computers, laptops, tablets, smart phones, wearable devices, gaming devices/platforms, virtualized reality devices/platforms (e.g., virtual reality (VR), augmented reality (AR), mixed reality (MR)), etc. The computing device 102 has an operating system that provides a graphical user interface (GUI) that allows users to interact with the computing device 102 via graphical elements, such as application windows (e.g., display areas), buttons, icons, and the like. For example, the graphical elements are displayed on a display screen 103 of the computing device 102 and can be selected and manipulated via user inputs received via a variety of input device types (e.g., keyboard, mouse, stylus, touch, spoken commands, gesture). In further examples, the computing device 102 includes or is communicatively connected to a microphone and/or a speaker via which the computing device 102 receives spoken user input and/or plays audio output, respectively.

In examples, the computing device 102 includes one or more applications (collectively, application 104) for performing various tasks. For instance, a user of the computing device 102 may use an application 104 to access and interact with websites and webpages, electronically communicate, generate, compose, edit, and/or manage information, manipulate data, perform visual construction, resource coordination, calculations, etc. The application 104 has an application UI 107 by which the user can view and interact with content and features provided by the application 104. In some examples, the application UI 107 is presented on the display screen 103. In some examples, the operating environment is a multi-application environment by which the user may view and interact with multiple applications through multiple application UIs 107.

As depicted in FIG. 1, the system 100 further includes an application chatbot 110 that provides information or assistance to users of the application 104 through natural language (e.g., human-like text) conversations. As will be described in further detail below, the application chatbot 110 provides functionality for receiving natural language input 105 from the application user, interpreting the user's intent, and using application-related context for generating and providing a contextually accurate response 175 in a conversation with the user. In some examples, the application chatbot 110 is hosted by a cloud platform service that hosts chatbots and makes them available to various channels, such as the application 104. A user of the application 104 may interact with the application chatbot 110 in a conversational or natural-language manner, using text, graphics, speech, gestures, etc.

In examples, the application chatbot 110 communicates with the application 104 using an application programming interface (API) 114 that enables real-time, interactive communication. In examples, the API 114 provides a set of predefined rules and protocols that allows the application chatbot 110 and the application 104 to communicate and exchange information. For instance, the API 114 enables the application chatbot 110 to make API requests to retrieve data or drive various application actions. The application chatbot 110 is operative to construct API requests including required data for retrieving data and/or driving the various application actions. In some examples, the application chatbot 110 is further operative to receive and interpret API responses and handle various scenarios based on data returned.

The application chatbot 110 provides a conversational interface in a chatbot UI 111 via which the user can provide natural language input 105 to the application chatbot 110, such as to request for information or assistance with the application 104 or application content. In some implementations, the chatbot UI 111 is displayed in a frame in the application UI 107. In other implementations, the chatbot UI 111 is displayed in a frame outside the application UI 107. In examples, when the user is authenticated, the user computing device 102 sends a message to the application chatbot 110 indicating the authentication of the user. User profile information about the user may also be provided to the application chatbot 110, or made accessible to the chatbot 110, such that the chatbot 110 may use that profile information to generate the responses to the user.

The application chatbot 110 receives the message(s) from the user input and routes the natural language input 105 to a natural language understanding service provided by one or more language models 106 in a first query 115. For instance, the application chatbot 110 is in communication with one or more language models 106 and uses the one or more language models 106 to identify or extract an intent of the natural language input 105, where the intent is a goal or task that the user wants to accomplish in in the application 104 via the application chatbot 110. As an example, the intent of the natural language input 105, "Please block tracking" may correspond to adjusting a privacy setting in the application 104.

In examples, the application chatbot 110 generates the first query 115 and passes it to a language model 106, where the first query 115 is constructed to prompt the language model 106 to determine and return one or more top-scoring intents of the natural language input 105. In further examples, the first query 115 is further constructed to prompt the language model 106 to determine and return any associated pieces of information that are relevant to the determined intent(s). The associated pieces of relevant information may referred to herein as entities. For instance, entities define data that can be extracted from the natural language input 105 and corresponds to data or information used to complete the user's desired action. The first query 115 may include a natural language statement or question, code snippets or commands, or a combination thereof.

In some implementations, the language model 106 is a conversational AI service model 116 that uses machine learning (ML) algorithms to analyze and categorize the user's natural language input 105 into an intent and associated entities. The language model 106 may also be a multimodal AI model. One example conversational AI service model 116 is the LUIS (Language Understanding Intelligent Service) machine-learning service, available from the Microsoft corporation. In training examples, the conversational AI service model 116 is provided with a collection of relevant user inputs and desired responses, and the conversational AI service model 116 is trained to recognize similar user inputs and classify them into appropriate intents and entity categories using the provided examples.

In other implementations, the language model 106 is embodied as a generative AI model 126 trained to understand and generate sequences of tokens, which may be in the form of natural language. The generative AI model 126 is a machine learning model that can understand complex intent, cause and effect, perform language translation, semantic search classification, complex classification, text sentiment, summarization, summarization for an audience, and/or other natural language capabilities. In some examples, the generative AI model 126 is in the form a deep neural network that utilizes a transformer architecture to process the text it receives as an input or query (e.g., first query 115). The neural network may include an input layer, multiple hidden layers, and an output layer. The hidden layers typically include attention mechanisms that allow the generative AI model 126 to focus on specific parts of the input text, and to generate context-aware outputs. The generative AI model 126 is generally trained using supervised learning based on large amounts of annotated text data and learns to predict the next word or the label of a given text sequence. The size of a generative AI model 126 may be measured by the number of parameters it has. For instance, as one example of a large language model (LLM), the GPT-3 model from OpenAI has billions of parameters. Other possible generative AI models include BARD form Google and LLaMA from Meta, among other possible options. The parameters may be the weights in the neural network that define its behavior, and a large number of parameters allows the model to capture complex patterns in the training data. The training process typically involves updating these weights using gradient descent algorithms, and is computationally intensive, requiring large amounts of computational resources and a considerable amount of time. The generative AI model 126 in examples herein, however, is pre-trained, meaning that the generative AI model 126 has already been trained on the large amount of data. This pre-training allows the model to have a strong understanding of the structure and meaning of text, which makes it more effective for the specific tasks discussed herein. In some implementations, the generative AI model 126 is multi-modal. For instance, the generative AI model 126 may receive inputs and/or generate outputs in different modes, such as text, images, speech, or a combination of these.

In some examples, the application chatbot 110 generates and includes a prompt to the generative AI model 126 in the first query 115, where the prompt includes a natural language statement or question to elicit at least one intent and any associated entities from the user's natural language input 105. An example prompt is, "What is the intent and associated relevant information of the following:", followed by the user's natural language input 105. In further examples, the application chatbot 110 generates and provides the generative AI model 126 a nested or chained prompt, where the output of one prompt can be used as the input of another prompt, creating more complex and dynamic interactions with the generative AI model 126.

In yet other implementations, the language model 106 is another type of AI language model 136 or ML model operative to analyze natural language input 105 and determine and provide one or more top-scoring intents and any associated entities to the application chatbot 110. In example implementations, the language model 106 operates on a device located remotely from the application chatbot 110. For instance, the application chatbot 110 may communicate with the language model 106 using one or a combination of networks (e.g., a private area network (PAN), a local area network (LAN), a wide area network (WAN)). In some examples, the language model 106 is implemented in a cloud-based environment or server-based environment using one or more cloud resources, such as server devices (e.g., web servers, file servers, application servers, database servers), personal computers (PCs), virtual devices, and mobile devices. The hardware of the cloud resources may be distributed across disparate regions in different geographic locations.

As represented in FIG. 1, the application chatbot 110 receives a first response 125 to the first query 115. In some examples, the first response 125 includes one or more top-scoring intents. In further examples, the first response 125 includes one or more entities associated with the determined intent(s). In other examples, the language model 106 may not be able to determine an intent based on the information included in the first query 115. In such cases, the application chatbot 110 may prompt the user for additional input. In some examples, the application chatbot 110 asks a question or provides a menu to direct the user to known intents.

According to examples, upon receiving the first response 125, the application chatbot 110 maps the determined intent to a first action in association with the application 104. Examples of the first action include sending data, retrieving data, updating information, executing a specific function (e.g., to enable/disable settings, modify data, navigate, perform DOM manipulation), etc. For instance, the determined intent triggers a first action taken by the application chatbot 110, such as an API call 135 to the API 114 specifying the first action and any parameters required to execute the action. According to examples, one or more entities extracted from the natural language input 105 are included in the API call 135 as parameters to perform the first action.

As an example, the user may provide a natural language input 105 to the application chatbot 110, such as, "Turn on dark mode" or "How do I turn on dark mode?", where dark mode is a setting of the application 104 that reduces the light emitted by the computing device screen 103 while maintaining readability of text and other graphical elements. The language model 106 determines the intent of the natural language input 105 and provides the intent to the application chatbot 110, such as a "set appearance" intent. The application chatbot 110 maps the "set appearance" intent to a first action, such as making an API call 135 to the API 114 to enable the dark mode setting. In another example, the application chatbot 110 generates a UI control (e.g., a button) that is presented in the chatbot UI 111, where the UI control invokes an API call 135 to execute a specific function. For instance, an option to select the UI control is presented in a contextual response 175 to the user in the chatbot conversation. When the UI control is selected, the application chatbot 110 makes the associated API call 135 to perform the desired function (e.g., enable the dark mode setting).

In some examples, the application chatbot 110 determines additional information is needed to generate and provide a contextual response 175 to the user. Thus, in some examples, the first action performed by the application chatbot 110 is to make an API call 135 to the API 114 to retrieve information from the application 104 that can be used to understand context about the natural language input 105. According to examples, the term "context" is used to describe information that can influence an interpretation of the intent and/or entities of the natural language input 105 and/or influence the subsequent action to be performed by the application chatbot 110. Some examples of context information obtained by the application chatbot 110 include settings information, an address of the webpage, page information from entity extraction, favorites, history, open tabs, etc. In some examples, the application chatbot 110 requests particular context information based on the determined intent of the natural language input 105. As an example, when a determined intent of a natural language input 105 is associated with a privacy setting, the application chatbot 110 maps the privacy setting intent to one or more pieces of data to analyze for security setting-related features.

In some examples, the application chatbot 110 uses obtained contextual information to determine a second action. As an example, the user may use the application 104 to access a webpage of a website that is requesting personal and/or private information, such as the user's email address, credit card number, etc. The user may want to know whether it is safe to enter the requested private information and, thus, provides a natural language input 105 in the chatbot UI 111, such as, "is it okay to enter my credit card number?" The application chatbot 110 receives the natural language input 105 and generates a first query 115 that is communicated to the language model 106 to elicit the intent of the user's natural language input 105 and any associated entities. For instance, a first response 125 from the language model 106 may indicate the user's intent is associated with protecting private data on a website. In response, the application chatbot 110 retrieves a set of context information from the application 104 that includes information related to the website, privacy settings, etc.

In some examples, the application chatbot 110 analyzes the obtained context information and determines a contextual response 175 for the user. In some implementations, the application chatbot 110 proceeds to query an information source 108 for information to provide an answer to the user's natural language request 105. In an example, a second query 145 is constructed to prompt the information source 108 to determine and return information corresponding to the intent and entities of the natural language input 105 and context information obtained from the application 104. For instance, continuing with the example above, the second query 145 is a request for information related to the safety of the website the user is viewing. Example information sources 108 include knowledge bases 128, data security information sources 138, and other information sources 148. The knowledge base 128 may include pre-existing information, databases, previously encountered questions and answers, etc.

Data security information sources 138 may include one or more website reputation checkers that provide information about the reputation of a website. For instance, the information provided by a website reputation checker can help the application chatbot 110 determine if a website is safe to visit or not, provide information about the website's domain age, popularity, traffic statistics, historical locations, changes, indications of suspicious activities discovered through malware behavior analysis, etc. Other information sources 148 may include websites, web services, databases, one or more language models 106, and/or other sources of information used to generate a contextual response 175 to the user's natural language input 105. In some examples, the application chatbot 110 makes a plurality of second queries 145 to one or more information sources 108 for information for generating the contextual response 175.

As an example, for the natural language input 105, "is it okay to enter my credit card number?", the application chatbot 110 constructs a second query 145 to obtain information about the reputation of the website the user is inquiring, which is indicated in the context provided by the application 104. For instance, the second query 145 is directed to an information source 108, such as a website reputation checker that checks the reputation of the website and provides a second response 155 to the application chatbot 110. The second response 155 includes information about the reputation of the website that the application chatbot 110 uses to determine whether it is safe. For instance, the second response 155 may include a safety score indicating a level of safety, information about personal and private data practices of the website, etc.

Based on the second response 155 from the information source 108, the application chatbot 110 determines a contextual response 175 to provide the user. For instance, if the reputation of the website is below a certain threshold, the application chatbot 110 determines a response, such as, "no." As another example, if the response from the website reputation checker indicates that the user's data will be tracked, the application chatbot 110 determines a natural language response that provides the user with a coherent answer, such as, "You can provide this website with your email, but not your credit card", or "This is fine; however, you will be tracked."

In some implementations, upon receiving the second response 155, the application chatbot 110 maps information in the second response 155 to a second action. In some examples, the application chatbot 110 generates a UI output (e.g., suggestion) based on the context information that may assist the user in their inquiry and provides the suggestion in the contextual response 175. For instance, the second action is a suggested next natural language input for the application chatbot 110.

The application chatbot 110 may generate and present a UI control in the chatbot UI 111, where the UI control invokes the suggested next inquiry. In other examples, the second action is associated with the application 104. For instance, the application chatbot 110 may construct an API call 135 to the API 114 specifying the second action and any parameters required to execute the second action in the application 104. In some examples the parameters are based on one or more entities extracted from the natural language input 105. Examples of the second action include sending data, retrieving data, updating information, executing a specific function (e.g., to enable/disable settings, modify data, navigate, perform DOM manipulation), etc. For instance, the application chatbot 110 generates a UI control (e.g., a button) that is presented in the chatbot UI 111, where the UI control invokes the API call 135 to execute the second action. When the UI control is selected, the application chatbot 110 makes the associated API call 135 to perform the second action.

As an example, in response to the natural language input 105, "is it okay to enter my credit card number?", the application chatbot 110 may determine that it is not safe to enter personal or private information and the application chatbot 110 may suggest using one or more services 112, such as a proxy payment service, a proxy communication service, etc. The application chatbot 110 may present an option in the contextual response 175 that, when selected, causes the application 104 to navigate to a website of the proxy payment service or the proxy communication service, where communications 165 are exchanged with the services 112. The navigation may also be to switch to a settings or configuration page of the application 104 where the proxy payment services or proxy communications services can be configured. For instance, the details for providing the proxy services may be provided through the presented configuration page. In other examples, the contextual response 175 may request the details needed to configure the proxy service and such details may be provided by the user via the chatbot UI 111. The application chatbot 110 may then provide those details, via the API 114, to the application 104 to have the application 104 configure the proxy service according to the details.

Figure 2:
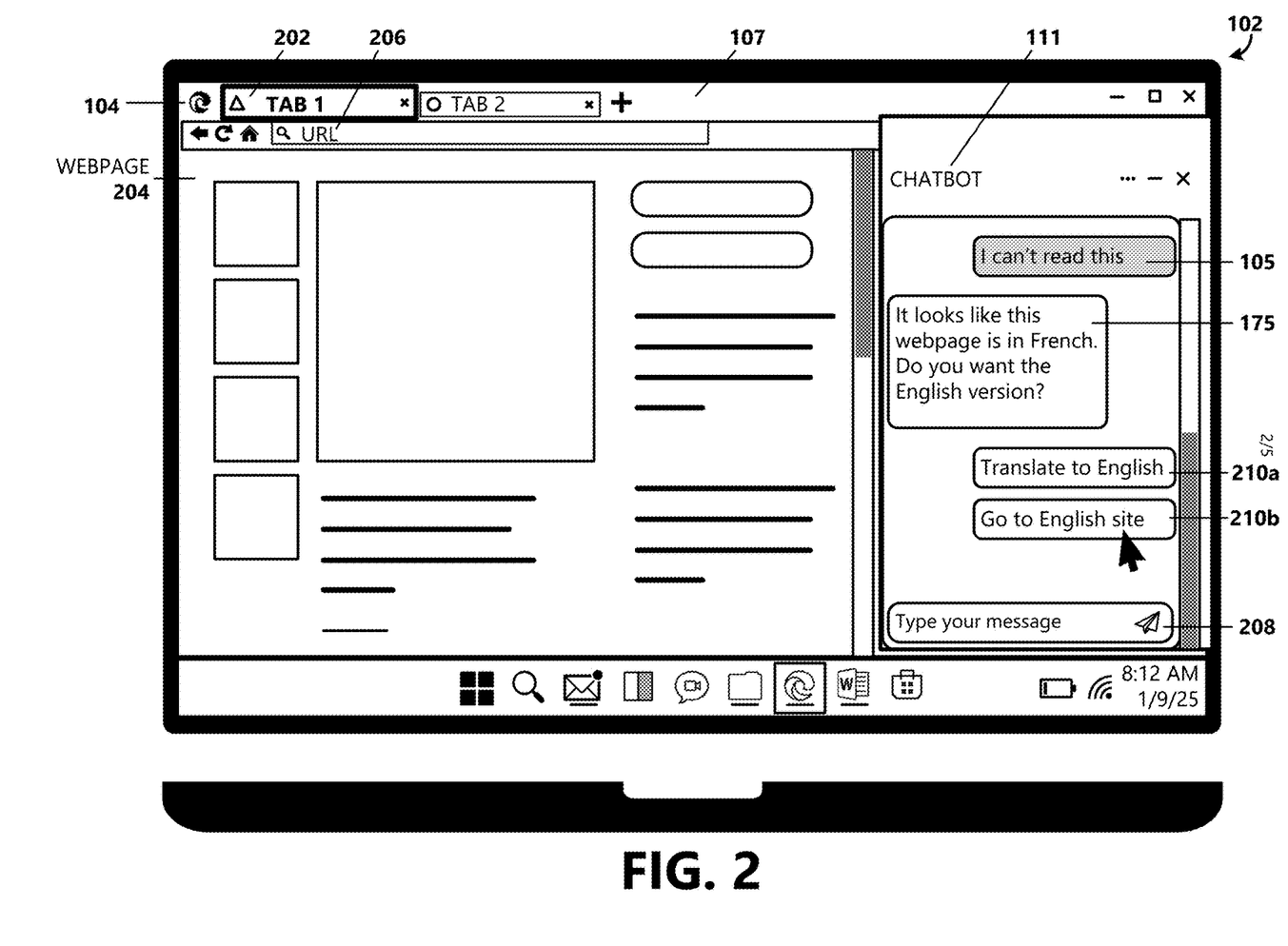
FIG. 2 is an illustration showing an example chatbot user interface.

With reference now to FIG. 2 an example chatbot UI 111 is depicted in an example web browser application UI 107. The web browser application UI 107 includes various features of the web browser application 104, such as a tab indicator 202 that indicates a particular webpage 204 that is being displayed in a main or primary browser frame. The web browser application UI 107 also includes a search or uniform resource locator (URL) bar 206 that includes a current URL of the webpage 204 that is being displayed by the web browser application 104. Other user interface elements are also presented by the web browser application 104. The web browser application 104 displays the webpage 204 in a main browsing frame or primary display area of the web browser application UI 107. The chatbot UI 111 provides an input field 208 via which the user can enter a natural language input 105 and a send option 210 that sends the natural language input 105 to the application chatbot 110.

As an example, the user may input the phrase, "I can't read this" into the input field 208. Based on information about the webpage 204, application settings, and/or other context information extracted from the application 104, the application chatbot 110 may determine a contextual response 175 corresponding to one or more intents determined for and any associated entities extracted from the received natural language input 105. A plurality of intents may be determined for the natural language input 105. For instance, the user's inquiry may relate to an appearance of the webpage 204 related to a display setting (e.g., the screen is too dark), a language of content of the webpage 204, a technical level of the content of the webpage 204, an accessibility setting of the application 104, etc. As such, the determined intents may include different settings adjustments, a language translation, summarization for an audience, etc. Based on obtained context information, the application chatbot 110 may determine the webpage content is in French, where language settings of the application 104 and/or operating system of the computing device 102 may be configured to another language (e.g., English). The user profile information of the user may also indicate the user is an English speaker or residing in an English-speaking country.

As depicted in FIG. 2, one or more second actions 210a and 210b are determined by the application chatbot 110, such as to translate that webpage 204 to English, modify the URL to an English equivalent, etc., and are presented to the user in a contextual response 175. Such second actions 210a and 210b may be selected by the user, and upon receipt of the selection, the application chatbot 110 causes the corresponding action to be performed. Causing the action to be performed may include executing a corresponding set of code and/or communicating corresponding requests to the application 104 via the API 114.

Figure 3A:
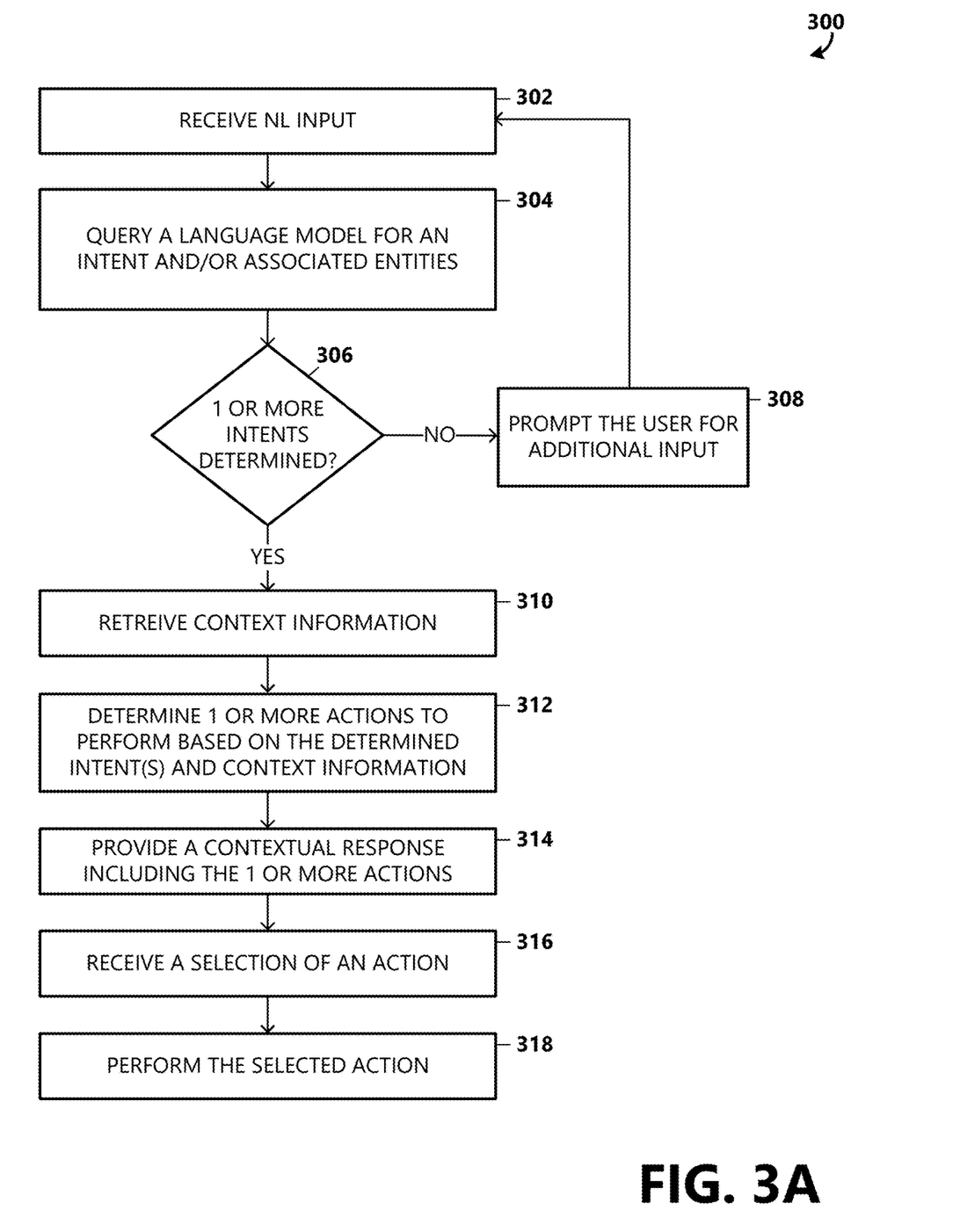
FIG. 3A is a flow diagram depicting an example method of providing a contextual response in a conversation.

FIG. 3A depicts an example method 300 for providing a contextual response 175 to a natural language input 105. For example, the operations of method 300 are performed by the application chatbot 110 to provide a contextually accurate response in a conversation with a user. At operation 302, a natural language input 105 is received. In an example, the chatbot UI 111 provides an input field 208 that the user uses to provide a natural language input 105 and a send option 210 that is selected to send the natural language input 105 to the application chatbot 110.

At operation 304, a first query 115 is constructed to prompt a language model 106 for an intent of the natural language input 105. The application chatbot 110 provides the natural language input 105 in the first query 115 to the language model 106. In some examples, the application chatbot 110 further includes a natural language statement or question in the first query 115 to elicit at least one intent and any associated entities from the user's natural language input 105.

A first response 125 from the language model 106 is received and, at decision operation 306, a determination is made as to whether the first response 125 includes a determined intent. In some examples, an intent may not be determined based on the information included in the first query 115 and, at operation 308, the application chatbot 110 prompts the user for additional input. The method 300 returns to operation 302, where additional natural language input 105 is received from the user that can be used for determining the user intent. In further examples, a determination is made as to whether an intent included in the first response 125 is associated with a known intent. For instance, the application chatbot 110 includes a mapping of various known intents to various actions that can be performed in association with the application 104.

When an intent determined by the language model 106 can be matched to a known intent, the method proceeds to operation 310, where the application chatbot 110 maps the intent to a first action. In an example, the first action includes retrieving a set of context information from the application 104. The context information may be associated with data to analyze for determining a contextual response 175. For instance, the application chatbot 110 makes an API call 135 to the API 114 to retrieve context information related to the determined intent and associated entities. The context information may include settings information, an address of the webpage, page information from entity extraction, favorites, history, open tabs, or other information that can be used to determine a contextual response 175 to the user. In other examples, the context may be extracted when receiving the natural language input at operation 302, and such context may be included in the first query. In such examples, the initial determination of intent(s) may be further based on the context.

At operation 312, the application chatbot 110 analyzes the context information and determines a second action to perform for generating a contextual response 175. In some examples, the application chatbot 110 queries an information source 108 for information to provide a contextual response 175 to the user's natural language request 105. The information source 108 provides the application chatbot 110 with information corresponding to the intent and entities of the natural language input 105 and context information obtained from the application 104. The application chatbot 110 uses the provided information to determine a second action. In some examples, the second action is provided as a suggestion. In some examples, the second action causes the application 104 to send data, retrieve data, update information, execute a specific function (e.g., to enable/disable settings, modify data, navigate, perform DOM manipulation), etc.

At operation 314, the application chatbot 110 may construct a contextual response 175 and provide the contextual response to the user via the chatbot UI 111. In some examples, the contextual response 175 includes a natural language response that answers or otherwise addresses the user's natural language input 105. In further examples, the contextual response 175 includes a selectable option associated with a second action.

At operation 316, a selection of an option is received, and at operation 318, the application chatbot 110 performs the selected action. In an example, the application chatbot 110 makes an API call 135 to the API 114 specifying the second action and any parameters required to execute the second action in the application 104. In some examples the parameters are based on one or more entities extracted from the natural language input 105.

Figure 3B:
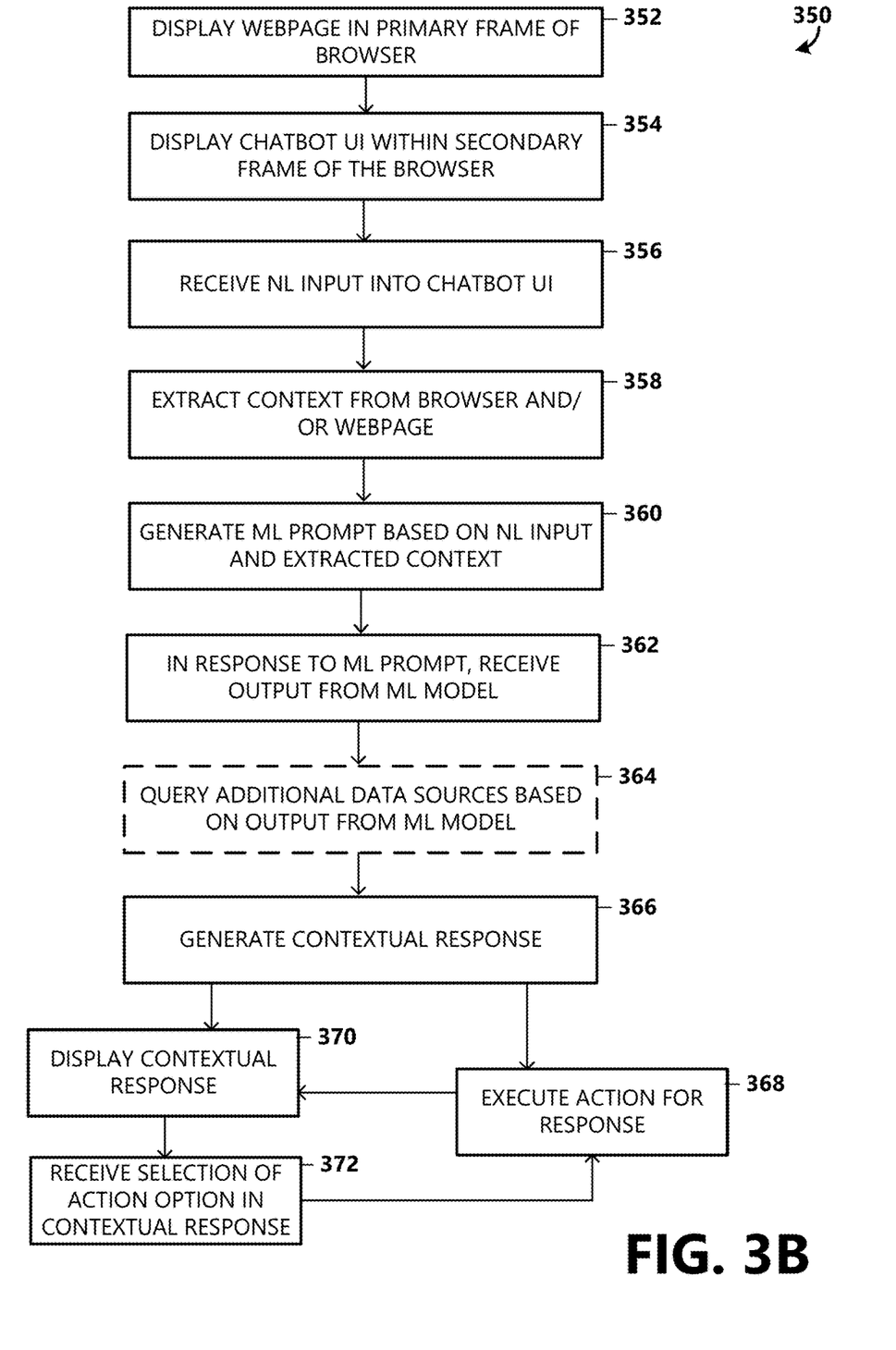
FIG. 3B depicts an example method for providing a contextual response to a natural language input received in a chatbot user interface of a web browser application.

FIG. 3B depicts an example method 350 for providing a contextual response to a natural language input received in a chatbot user interface of a web browser application. At operation 352, a webpage is displayed in a primary browsing frame of the web browser application. The webpage has a particular web address (e.g., URL) and may have been accessed via the selection of a link or manual entry of the URL into the web browser application.

At operation 354, a chatbot UI is displayed within a secondary frame of the web browser application. For instance, the chatbot UI may be displayed within a side pane of the web browser application and displayed concurrently with the webpage. The chatbot UI may be displayed in response to an activation input, such as the selection of a corresponding icon presented within the web browser application. In other examples, the chatbot UI may be activated via other types of inputs or triggers, such as voice triggers or other modes of user input.

At operation 356, an NL input is received into the chatbot UI. As discussed above, the NL input may be in the form of a question or request to improve security of the browsing session and/or expose settings that may be difficult to identify or are otherwise unknown to the user. The NL input may be received via text entry and/or voice input. When the NL input is received as voice input, the corresponding audio may be transcribed to text to be provided or incorporated into the prompt or query for the ML model. In some examples, the ML model may be a multimodal model that is able to process audio as well, in which case the audio may not be transcribed prior to use for prompting the ML model.

At operation 358, context is extracted from the web browser application and/or the webpage that is being displayed. The context may be data about the displayed webpage and/or the current browsing session. The context may include settings information, an address of the webpage, favorites, history, open tabs, etc. The context may also include entities or data extracted from the webpage being displayed. For example, an entity-extraction algorithm may be executed against the content of the webpage that is being displayed to extract entities or data from the webpage, such as products that being sold on the webpage, keywords of the webpage, or other significant data about the webpage. Different fields available on the website and their categories or titles may also be extracted.

At operation 360, an ML prompt is generated that includes the NL input received in operation 356 and the context received in operation 360. For example, the ML prompt may include one or more static segments and are repeated for each ML prompt that is generated. For example, the static segments may include a request segment, a criteria segment, and/or an example segment. The request segment may include a phrase that indicates the requested data, such as "Provide the intent of the following natural language input based on the context that follows." The natural language input and the context are then injected into the prompt as dynamic segments of the prompt. The criteria segment may provide instructions for the format from the output of the ML model. The example segment may provide example inputs and outputs to provide examples of prior proper or expected input/output pairs. The prompt may be formed as a data package, payload, or object, such as in a JavaScript Object Notation (JSON) format.

The generated prompt is then provided as input to the ML model, which may be a generative AI model, a language model, a multimodal model, or similar models as discussed herein. The ML model processes the prompt and generates an output.

In the examples where the ML model is a generative AI model, the model may be a transformer-type neural network. Such an architecture may employ an encoder-decoder structure and self-attenuation mechanisms to process the input data (e.g., the prompt). Initial processing of the prompt may include tokenizing the prompt into tokens that may then be mapped to a unique integer or mathematical representation. The integers or mathematical representations combined into vectors that may have a fixed size. These vectors may also be known as embeddings.

The initial layer of the transformer model receives the token embeddings. Each of the subsequent layers in the model may use a self-attention mechanism that allows the model to weigh the importance of each token in relation to every other token in the input. In other words, the self-attention mechanism may compute a score for each token pair, which signifies how much attention should be given to other tokens when encoding a particular token. These scores are then used to create a weighted combination of the input embeddings.

In some examples, each layer of the transformer model consists of two primary sub-layers: the self-attention sub-layer and a feed-forward neural network sub-layer. The self-attention mechanism mentioned above is applied first, followed by the feed-forward neural network. The feed-forward neural network may be the same for each position and apply a simple neural network to each of the attention output vectors. The output of one layer becomes the input to the next. This means that each layer incrementally builds upon the understanding and processing of the data made by the previous layers. The output of the final layer may be processed and passed through a linear layer and a softmax activation function. This outputs a probability distribution over all possible tokens in the model's vocabulary. The token(s) with the highest probability is selected as the output token(s) for the corresponding input token(s).

The output generated from the ML model in response to the prompt is then received in operation 362. The output may be received as a data package or payload, such as a JSON payload. The output may include one or more intents and entities of the natural language input received in operation 356. Because the context was included in the prompt, the intent(s) and/or entities identified in the output may also be based on the context provided. The intents may be used to further identify contextual responses to the user, such as by querying a database or grammar to identify a template contextual response that is filled with the identified entities. In some examples, the contextual response may be provided directly in the output of the ML model, such as text to be displayed in the chatbot UI of the web browser application and/or subsequent suggested questions, among other types of contextual responses discussed above.

In some examples, the output of the ML model may further include executable code or instructions that, when executed or performed, drives or operates the web browser application to perform actions responsive to the natural language input received in operation 356. For instance, the code or instructions, when executed, cause the browser to perform operations such as changing settings (e.g., enabling/disabling browser settings), navigate to particular webpages (e.g., opening a new tab or window and navigating to a webpage having a web address specified in the code), and/or perform DOM manipulation (e.g., selection, text insertion, copy, paste). The instructions may also include additional queries that should be performed to request additional information that may be used in generating the contextual response.

At operation 364, based on the output from the ML model, additional data sources may be queried to request and receive additional data to be incorporated into the contextual response. For instance, as discussed above, the additional data sources may be data sources about website security or reputation, among other types of data sources. The data sources may be external to the computing system operating the browser, such as different sources accessible via the Internet.

At operation 366, a contextual response is generated based on the output of the ML model received at operation 362 and the additional data received from the additional data sources received in operation 364 (where performed). The contextual response may include text to be displayed and/or selectable options that may be presented in the chatbot UI. For instance, at operation 370, the text and/or selectable options of the contextual response may be displayed in the chatbot UI.

The selectable options may be options that correspond to actions that are to be performed for which executable code is provided in the ML output. When a selection of such an action option is received in operation 372, the corresponding action is performed in operation 368 by executed the section of code in the ML output that corresponds to the selected action. The options may also be presented as a suggestion or question, and selection of the action may be provided by text entry into the chat interface (e.g., "yes" or an equivalent affirmative natural language input). For instance, the contextual response may include a proposed settings change, such as a change to security settings or another setting of the web browser application. As an example, the displayed contextual response may include the phrase "Would you the anti-tracking privacy setting to be enabled?". A response of "Yes" received from the user causes corresponding executable code to be executed to enable to the corresponding setting to be enabled.

In some examples, one or more of the actions set forth in the executable code of the ML output, are performed in operation 368 prior to or concurrently with displaying the contextual response in operation 372. For example, the actions executed may generate additional text for the contextual response that are then included in the response and displayed in operation 370.

The method 350 may be repeated for subsequent natural language inputs that are received into the chatbot interface. For subsequent natural language inputs, however, the prior set of inputs and outputs may further be incorporated into the subsequent prompts to provide for conversational state of the current chat session between the user and the chatbot service.

The following provides some non-limiting example exchanges that may be supported by the technology discussed herein. As one example, the natural language input may be "Should I type in my credit card?". The context of the current webpage (e.g., current URL) may be provided with the natural language input to the ML model, and actions performed based on the output of the model may include querying a security database to determine the safety or reputation of the webpage. Based on the additional security data from the additional data source, the contextual response displayed in the chatbot UI may be "This is fine, however, you will be tracked. Would you like to block tracking?" A response of "Yes" received from the user causes the action of enabling the block-tracking setting to be enabled.

As another example, the natural language input may be "Have I browsed anywhere bad in the last month?", or some other equivalent request to examine the browsing history for a set time period (e.g., 30 days). The ML output generated based on that natural language input may cause queries to be performed against an additional data source, such as a website reputation or data breach database, for each webpage indicated in the browsing history for the last 30 days. In examples where the browsing history is included as context in the prompt along with the natural language input, the set of executable code in the ML output may include code for executing the corresponding queries for each webpage against the security or data breach data sources. Based on the data returned from the data sources, the contextual response may be generated that indicates the potential unsafe webpages that were visited. For instance, the contextual response displayed in the chatbot UI may be "Last week you browsed 'Discount Shoes' and they have had a data breach. Would you like to change your password for that site?". If a "Yes" input is received from the user, additional actions may be performed to navigate the web browser application to a corresponding password change page or menu.

As yet another example, the natural language input may be "Is this the cheapest price?". Such a request only makes sense if the chatbot service is aware of the product that is being viewed on the webpage. Accordingly, the webpage content may be provided as context into the prompt. An entity extraction service may also or alternatively be performed on the content of the webpage to identify the specific product being displayed on the webpage (e.g., a particular pair of sneakers or a particular flight). The extracted entity (e.g., product of sneakers or flight) is then used as context to allow for the contextual response to ultimately be generated by performing search actions across multiple websites for the extracted entity and its respective price.

While the above examples have been primarily provided in light of a web browser application, the technology discussed herein may also be applicable to other application types or to an operating system. For instance, the chatbot service may interface with other types of applications or an operating system through a suitable API that allows for context to be passed to the chatbot service and/or for the chatbot service to cause the application or operating system to perform operations set forth in the outputs of the ML model(s).

FIG. 4 and the associated description provide a discussion of a variety of operating environments in which examples of the invention may be practiced. However, the devices and systems illustrated and discussed with respect to FIG. 4 is for purposes of example and illustration and is not limiting of a vast number of computing device configurations that may be utilized for practicing aspects of the invention, described herein. FIG. 4 is a block diagram illustrating physical components (i.e., hardware) of a computing device 400 with which examples of the present disclosure may be practiced. The computing device components described below may be suitable for a client device running the web browser discussed above. In a basic configuration, the computing device 400 may include at least one processing unit 402 and a system memory 404. The processing unit(s) (e.g., processors) may be referred to as a processing system. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running software applications 450 (e.g., the application chatbot 110).

The operating system 405, for example, may be suitable for controlling the operation of the computing device 400. Furthermore, aspects of the invention may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 may perform processes including, but not limited to, one or more of the operations of the method illustrated in FIG. 3. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 400 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 400 may also have one or more input device(s) 412 such as a keyboard, a mouse, a pen, a sound input device, a touch input device, etc. The output device(s) 414 such as a display, speakers, a printer, etc. may also be included. The aforementioned devices are examples and others may be used. The computing device 400 may include one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In an aspect, the technology relates to a computing system for exposing settings of a web browser application, the computing system comprising: at least one processor; and memory storing instructions that, when executed by the at least one processor, cause the computing system to perform operations comprising: displaying a webpage within a web browser application; displaying, concurrently with the webpage, a chatbot interface in the web browser application; receiving a natural language input into the chatbot interface; extracting context from the displayed webpage; generate a prompt for a machine learning (ML) model, wherein the prompt includes the natural language input and the context extracted for the webpage; provide the prompt as input into the ML model; in response to the prompt, receiving an output from the ML model, wherein the output includes executable code for performing one or more actions based on the natural language input; executing a portion of the code to cause the web browser application to perform at least one of the one or more actions; and display a contextual response, within the chatbot interface, based on the output received from the ML model.

In some examples, the one or more actions include adjusting a setting of the web browser application. In further examples, the one or more actions include querying an external data source for additional information. In still further examples, the contextual response is further based on the additional information from the external data source. In additional examples, the natural language input relates to security of the webpage. In further additional examples, the contextual response includes a proposed setting change to a setting of the web browser application. In still further additional examples, the instructions further cause the computing system to receive an affirmative natural language input for the proposed setting change; and in response to the receiving the affirmative natural language input, execute a portion of the executable code to cause the web browser application to implement the proposed setting change to the setting of the web browser application. In yet further examples, the one or more actions include at least one of: enabling a setting; disabling a setting; navigating to a new webpage; or performing a document object model (DOM) manipulation of the displayed webpage. In still further examples, the ML model is a generative AI model that processes the prompt by employing an encoder-decoder structure and self-attenuation mechanisms for multiple layers of a transformer-based neural network.

In an aspect, the technology relates to a computing system for performing actions in an application is response to natural language input, the computing system comprising: at least one processor; and memory storing instructions that, when executed by the at least one processor, cause the computing system to perform operations comprising: receiving a natural language input into a chatbot interface displayed in an application; querying an ML model for an intent of the natural language input; receiving an output payload from the ML model include the intent of the natural language input; based on the intent of the natural language input, retrieving context from the application; determining an action to be performed based retrieved context and the intent; presenting a contextual response in the chatbot interface including an option for performing the action; receiving a selection of the action; and causing the action to be performed by the application.

In some examples, the application is a web browser application, and the context includes at least one of: settings information for settings of the web browser application; an address of a webpage displayed in an active tab of the web browser application; webpage content; one or more entities extracted from the webpage; favorites; browsing history; or webpages of other open tabs. In further examples, causing the action to be performed includes generating one or more application programming interface (API) calls to an API of the application. In still further examples, the context is retrieved via the API. In even further examples, the action includes at least one of: enabling a setting of the application; disabling a setting of the application; navigating to a new page; inserting content into the application; and copying content from the application. In additional examples, the output payload from the ML model includes executable code for causing the action to be performed.

In an aspect, the technology relates to a computer-implemented method of enhancing security in a web browser application, the method comprising: displaying a webpage within the web browser application; displaying, concurrently with the webpage, a chatbot interface in the web browser application; receiving a natural language input into the chatbot interface, the natural language input relating to at least one of safety of the webpage or a web browsing session; extracting context for at least one of the displayed webpage or the web browsing session; generating a prompt for a machine learning (ML) model, wherein the prompt includes the natural language input and the extracted context; providing the prompt as input into the ML model; in response to the prompt, receiving an output from the ML model, wherein the output includes executable code for performing one or more actions for changing a security setting of the web browser application; displaying a contextual response, within the chatbot interface, based on the output received from the ML model, the contextual response including a proposed change to the security setting; receiving, within the chatbot interface, an affirmative response; and based on the affirmative response, executing a portion of the code to cause the web browser application to change the security setting.

In some examples, the output also includes executable code for querying a data security information source for security data about the webpage. In further examples, the context includes at least one of settings information for settings of the web browser application; an address of a webpage displayed in an active tab of the web browser application; webpage content; one or more entities extracted from the webpage; favorites; browsing history; or webpages of other open tabs. In still further examples, the security setting is a tracking setting. In yet further examples, the ML model is a generative AI model.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

We claim:

1. A computing system for exposing settings of a web browser application, the computing system comprising:
   at least one processor; and
   memory storing instructions that, when executed by the at least one processor, cause the computing system to perform operations comprising:
   displaying a webpage within a web browser application;

displaying, concurrently with the webpage, a chatbot interface in the web browser application;
receiving a natural language input into the chatbot interface;
extracting context from the displayed webpage;
generating a prompt for a machine learning (ML) model, wherein the prompt includes the natural language input and the context extracted for the webpage;
providing the prompt as input into the ML model;
in response to the prompt, receiving an output from the ML model, wherein the output includes executable code for performing one or more actions based on the natural language input;
executing a portion of the code to cause the web browser application to perform at least one of the one or more actions;
displaying a contextual response, within the chatbot interface, based on the output received from the ML model, wherein the contextual response includes a proposed setting change to a setting of the web browser application;
receiving an affirmative response for the proposed settings change; and
based on receiving the affirmative response, executing a portion of the executable code to cause the web browser application to implement the proposed setting change to the setting of the web browser application.

2. The computing system of claim 1, wherein the one or more actions include adjusting the setting of the web browser application.

3. The computing system of claim 1, wherein the one or more actions include querying an external data source for additional information.

4. The computing system of claim 3, wherein the contextual response is further based on the additional information from the external data source.

5. The computing system of claim 3, wherein the natural language input relates to security of the webpage.

6. The computing system of claim 1, wherein the one or more actions include at least one of: enabling the setting; disabling the setting; navigating to a new webpage; or performing a document object model (DOM) manipulation of the displayed webpage.

7. The computing system of claim 1, wherein the ML model is a generative AI model that processes the prompt by employing an encoder-decoder structure and self-attenuation mechanisms for multiple layers of a transformer-based neural network.

8. The computing system of claim 1, wherein the setting is a security setting.

9. The computing system of claim 1, wherein the affirmative response is a natural language response.

10. A computer-implemented method of enhancing security in a web browser application, the method comprising:
displaying a webpage within the web browser application;
displaying, concurrently with the webpage, a chatbot interface in the web browser application;
receiving a natural language input into the chatbot interface, the natural language input relating to at least one of safety of the webpage or a web browsing session;
extracting context for at least one of the displayed webpage or the web browsing session;
generating a prompt for a machine learning (ML) model, wherein the prompt includes the natural language input and the extracted context;
providing the prompt as input into the ML model;
in response to the prompt, receiving an output from the ML model, wherein the output includes executable code for performing one or more actions for changing a security setting of the web browser application;
displaying a contextual response, within the chatbot interface, based on the output received from the ML model, the contextual response including a proposed change to the security setting;
receiving, within the chatbot interface, an affirmative response; and
based on the affirmative response, executing a portion of the code to cause the web browser application to change the security setting.

11. The computer-implemented method of claim 10, wherein the output also includes executable code for querying a data security information source for security data about the webpage.

12. The computer-implemented method of claim 10, wherein the context includes at least one of settings information for settings of the web browser application; an address of a webpage displayed in an active tab of the web browser application; webpage content; one or more entities extracted from the webpage; favorites; browsing history; or webpages of other open tabs.

13. The computer-implemented method of claim 10, wherein the security setting is a tracking setting.

14. The computer-implemented method of claim 10, wherein the ML model is a generative AI model.

15. A computer-implemented method of enhancing security in a web browser application, the method comprising:
displaying a webpage within a web browser application;
displaying, concurrently with the webpage, a chatbot interface in the web browser application;
receiving a natural language input into the chatbot interface;
extracting context from the displayed webpage;
generating a prompt for a machine learning (ML) model, wherein the prompt includes the natural language input and the context extracted for the webpage;
providing the prompt as input into the ML model;
in response to the prompt, receiving an output from the ML model, wherein the output includes executable code for performing one or more actions based on the natural language input;
executing a portion of the code to cause the web browser application to perform at least one of the one or more actions;
displaying a contextual response, within the chatbot interface, based on the output received from the ML model, wherein the contextual response includes a proposed setting change to a setting of the web browser application;
receiving an affirmative response for the proposed settings change; and
based on receiving the affirmative response, executing a portion of the executable code to cause the web browser application to implement the proposed setting change to the setting of the web browser application.

16. The computer-implemented method of claim 15, wherein the one or more actions include querying an external data source for additional information.

17. The computer-implemented method of claim 16, wherein the contextual response is further based on the additional information from the external data source.

18. The computer-implemented method of claim 15, wherein the natural language input relates to security of the webpage.

19. The computer-implemented method of claim 15, wherein the ML model is a generative AI model that processes the prompt by employing an encoder-decoder structure and self-attenuation mechanisms for multiple layers of a transformer-based neural network.

20. The computer-implemented method of claim 15, wherein the one or more actions include at least one of: enabling the setting; disabling the setting; navigating to a new webpage; or performing a document object model (DOM) manipulation of the displayed webpage.

* * * * *